US010668956B2

(12) United States Patent
Sekiya et al.

(10) Patent No.: US 10,668,956 B2
(45) Date of Patent: Jun. 2, 2020

(54) VEHICLE BODY FRONT STRUCTURE

(71) Applicant: HONDA MOTOR CO., LTD., Tokyo (JP)

(72) Inventors: Takayuki Sekiya, Wako (JP); Akira Haga, Wako (JP); Katsuya Fujimori, Wako (JP); Tomoo Watanabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/039,695

(22) Filed: Jul. 19, 2018

(65) Prior Publication Data

US 2019/0023324 A1 Jan. 24, 2019

(30) Foreign Application Priority Data

Jul. 21, 2017 (JP) .................................. 2017-141618

(51) Int. Cl.
*B62D 25/20* (2006.01)
*B62D 25/08* (2006.01)
*B62D 21/15* (2006.01)
*B60K 1/04* (2019.01)
*B62D 25/02* (2006.01)

(52) U.S. Cl.
CPC .......... *B62D 25/2036* (2013.01); *B60K 1/04* (2013.01); *B62D 21/15* (2013.01); *B62D 25/025* (2013.01); *B62D 25/082* (2013.01); *B62D 25/20* (2013.01); *B62D 25/2045* (2013.01); *B60K 2001/0438* (2013.01); *B60Y 2306/01* (2013.01); *B62D 25/2009* (2013.01)

(58) Field of Classification Search
CPC .......... B60K 2001/0438; B62D 25/025; B62D 25/2036; B62D 25/2045; B62D 25/2082; B62D 25/082

See application file for complete search history.

(56) References Cited

U.S. PATENT DOCUMENTS

| 9,102,364 | B2 * | 8/2015 | Bosche | B62D 25/2018 |
| 10,421,423 | B2 * | 9/2019 | Ryu | B60R 19/04 |
| 2009/0001761 | A1 | 1/2009 | Yasuhara et al. | |

(Continued)

FOREIGN PATENT DOCUMENTS

| JP | 2002-331966 A | 11/2002 |
| JP | 2007-210572 A | 8/2007 |

(Continued)

OTHER PUBLICATIONS

Japanese Office Action dated Feb. 5, 2019 with English translation, 11pages.

*Primary Examiner* — Jason S Morrow
(74) *Attorney, Agent, or Firm* — Rankin, Hill & Clark LLP

(57) ABSTRACT

A vehicle body front structure includes paired left and right front side frames extending in a vehicle front-rear direction and a crossmember that extends in a vehicle width direction and is suspended between the paired left and right front side frames. The front side frames respectively have side frame bend portions at rear portions thereof, the side frame bend portions bending inward in the vehicle width direction, and at least one of end portions of the crossmember in the vehicle width direction is connected to a corresponding one of the side frame bend portions.

9 Claims, 6 Drawing Sheets

(56) References Cited

U.S. PATENT DOCUMENTS

| | | | |
|---|---|---|---|
| 2009/0001766 A1 | 1/2009 | Kurata | |
| 2010/0171340 A1* | 7/2010 | Yasuhara | B62D 21/11 |
| | | | 296/205 |
| 2012/0212009 A1 | 8/2012 | Ishizono et al. | |
| 2012/0256446 A1* | 10/2012 | Yasuhara | B62D 21/11 |
| | | | 296/193.07 |
| 2013/0119706 A1 | 5/2013 | Katayama et al. | |
| 2013/0341969 A1* | 12/2013 | Fujii | B62D 25/2036 |
| | | | 296/193.07 |
| 2017/0029038 A1* | 2/2017 | Sato | B62D 25/2018 |
| 2018/0339668 A1* | 11/2018 | Ryu | B60R 19/18 |
| 2019/0276080 A1* | 9/2019 | Otoguro | B60K 1/04 |
| 2019/0276081 A1* | 9/2019 | Otoguro | B60K 1/04 |

FOREIGN PATENT DOCUMENTS

| | | |
|---|---|---|
| JP | 2009-006902 A | 1/2009 |
| JP | 2013-105615 A | 5/2013 |
| JP | 5738163 B2 | 6/2015 |
| WO | 2011055695 A1 | 5/2011 |

* cited by examiner

VEHICLE BODY FRONT STRUCTURE

BACKGROUND OF THE INVENTION

1. Field of the Invention

The present invention relates to a vehicle body front structure in a vehicle such as an automobile.

2. Description of the Related Art

For example, Japanese Patent No. 5738163 (referred to as Patent Literature 1 hereinbelow) discloses a vehicle front structure provided with a crossmember to transmit an impact load inputted from the front of a vehicle to left and right side sills.

In the vehicle front structure disclosed in Patent Literature 1, the crossmember is connected to rear areas of bend portions of front side frames. Specifically, both end portions of the crossmember are connected to the rear areas of the bend portions where the bend portions complete the bending.

There are cases where an impact load (e.g., an offset impact load) is inputted to only one of the paired left and right front side frames.

In such cases, in the vehicle front structure disclosed in Patent Literature 1, the impact load is unlikely to be transmitted to the side sill on the non-impact side since the crossmember is connected to the rear areas of the bend portions of the front side frames.

SUMMARY OF THE INVENTION

The present invention has been made to solve the above problems and has an object to provide a vehicle body front structure capable of improving efficiency of impact load transmission by transmitting an impact load also to the side sill on the non-impact side.

To achieve the above-described object, the present invention provides a vehicle body front structure comprising: paired left and right front side frames extending in a vehicle front-rear direction; and a crossmember that extends in a vehicle width direction and is suspended between the paired left and right front side frames. The front side frames respectively have side frame bend portions at rear portions thereof, the side frame bend portions bending inward in the vehicle width direction, and at least one of end portions of the crossmember in the vehicle width direction is connected to a corresponding one of the side frame bend portions.

According to the present invention, a vehicle body front structure is obtained which is capable of improving the efficiency of impact load transmission by allowing an impact load to be transmitted also to the side sill on the non-impact side.

DETAILED DESCRIPTION OF THE EMBODIMENTS

Figure 1:
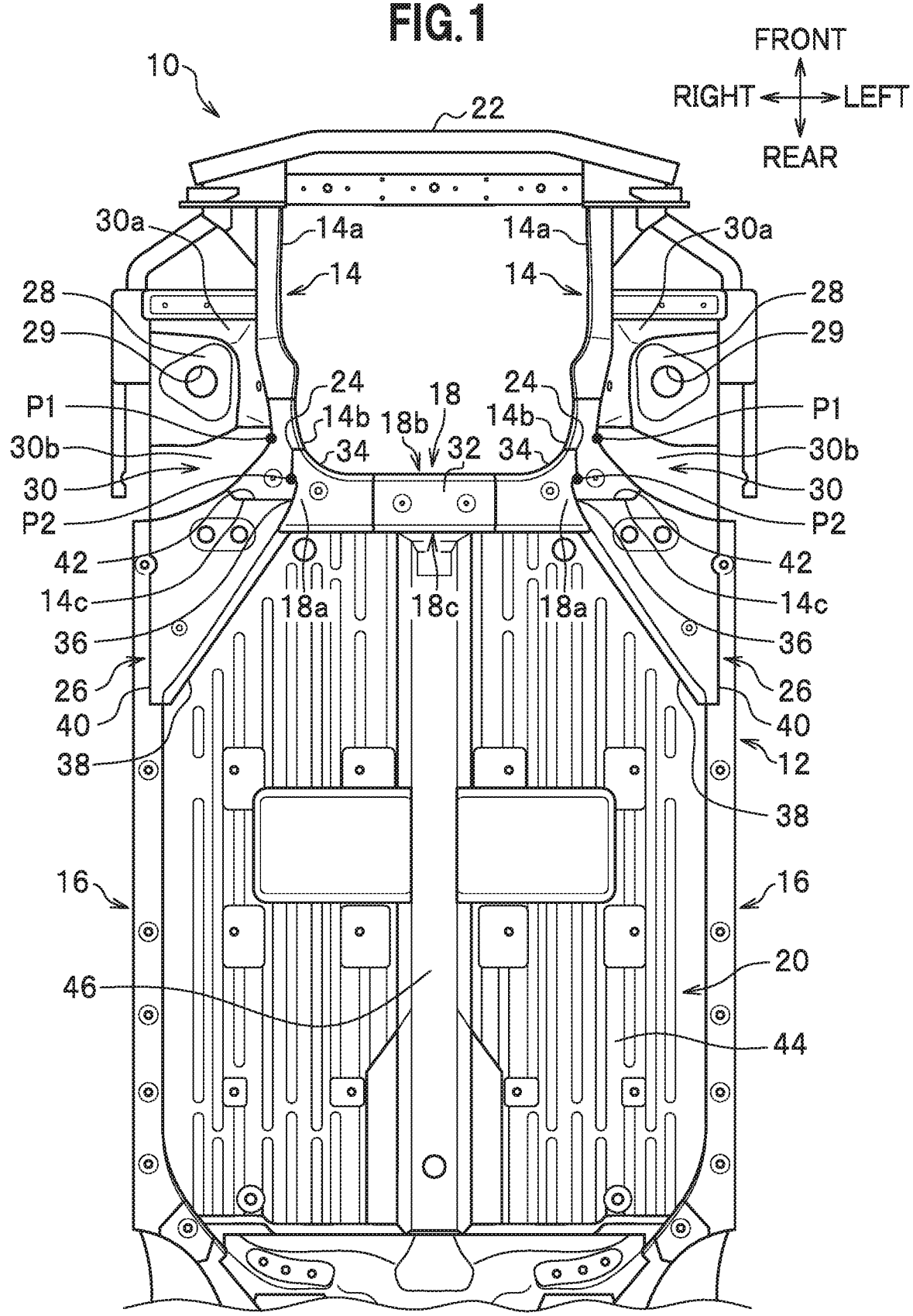
FIG. 1 is a bottom view of a vehicle body front structure according to an embodiment of the present invention seen from below, the bottom view omitting some components.

Next, an embodiment of the present invention is described in detail with reference to the drawings when necessary. In the drawings, "FRONT" and "REAR" indicate a vehicle front-rear direction, "LEFT" and "RIGHT" indicate a vehicle width direction (left-right direction), and "UP" and "DOWN" indicate a vertical direction.

As illustrated in FIG. 1, a vehicle 10 to which the vehicle body front structure according to the embodiment of the present invention is applied has a vehicle body 12 of a monocoque body construction. The vehicle body 12 resides symmetrically about an imaginary center line (not shown) extending in the vehicle front-rear direction on the center of the vehicle 10 in the vehicle width direction. Although the vehicle 10 to which the present embodiment is applied is an electric vehicle, the present invention is not limited to this, and may be applied to, for example, a plug-in hybrid vehicle as well.

The vehicle body 12 includes paired left and right front side frames 14, 14, paired left and right side sills 16, 16, a crossmember 18, and a floor panel 20.

The paired left and right front side frames 14, 14 are respectively situated at left and right sides of the front part of the vehicle body, and extend in the vehicle front-rear direction. The paired left and right front side frames 14, 14 respectively have paired left and right straight portions 14a, 14a, paired left and right side frame bend portions 14b, 14b, and paired left and right vehicle rear connection portions 14c, 14c.

The paired left and right straight portions 14a, 14a are situated at front portions of the respective front side frames 14 and extend substantially in parallel with each other. A bumper beam 22 bridges front end portions of the respective straight portions 14a and extends in the vehicle width direction.

Figure 2:
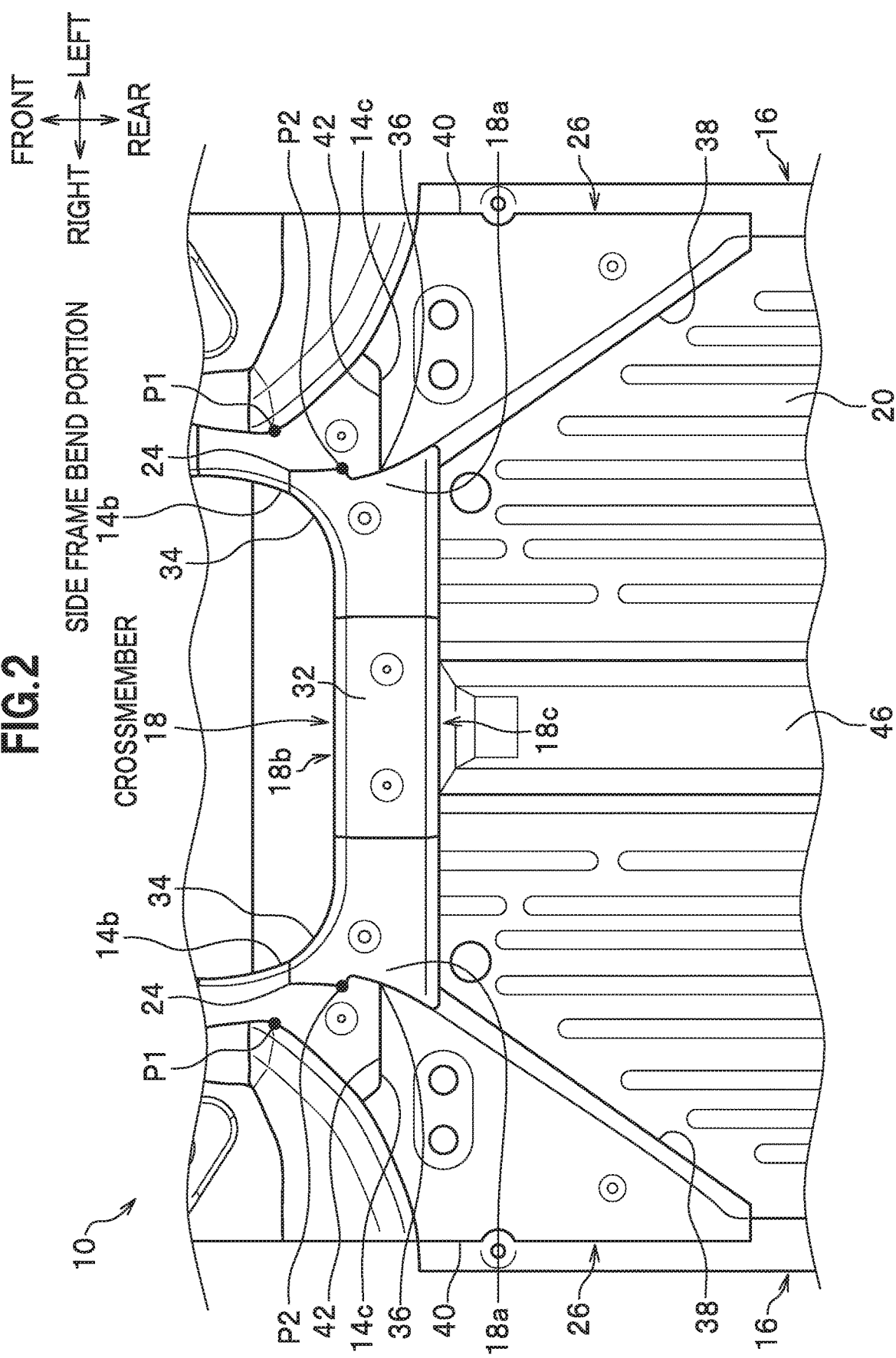
FIG. 2 is a bottom view magnifying a crossmember and its surrounding area illustrated in FIG. 1.

The paired left and right side frame bend portions 14b, 14b are continuous from vehicle rear end portions of the respective straight portions 14a, and bend inward in the vehicle width direction at the rear portions of the front side frames 14 in the vehicle front-rear direction (see FIGS. 1 and 2). In other words, the paired left and right side frame bend portions 14b face each other and are slanted inward in the vehicle width direction with the rear portions thereof being closer to each other than the front portions thereof in a bottom view seen from the rear of the vehicle.

Each side frame bend portion 14b has an outer bend point P1 situated on an outer side thereof in the vehicle width direction. The outer bend point P1 is opposite a vehicle front end portion 24 of the crossmember 18 in the vehicle width direction, the vehicle front end portion 24 being situated on an outer side of the crossmember 18 in the vehicle width direction. Each side frame bend portion 14b also has an inner bend point P2 situated on an inner side thereof in the vehicle width direction. The inner bend point P2 is situated adjacent to the crossmember 18 in the vehicle width direction.

The paired left and right vehicle rear connection portions 14c, 14c are respectively connected (joined) to paired left and right outriggers 26, 26 to be described later.

As illustrated in FIG. 1, paired left and right damper bases 28, 28 and paired left and right damper housings 30, 30 are disposed outward of the middle portions of the respective front side frames 14 in the vehicle width direction. Each damper base 28 has a support hole 29 to support the upper end of a damper (not shown). Further, each of the damper housings 30 is situated between the corresponding damper base 28 and the corresponding front side frame 14. The damper housing 30 is formed by two members, a front damper housing 30a and a rear damper housing 30b, and is joined to both the damper base 28 and the front side frame 14.

As illustrated in FIG. 1, the crossmember 18 extends straight in the vehicle width direction and is suspended between the paired left and right front side frames 14, 14. End portions 18a, 18a of the crossmember 18 in the vehicle width direction are connected to the respective side frame bend portions 14b, 14b.

Although the end portions 18a, 18a of the crossmember 18 in the vehicle width direction are connected to the respective side frame bend portions 14b in the present embodiment, the present invention is not limited to this, and at least one of the end portions 18a may be connected to the corresponding side frame bend portion 14b.

As illustrated in FIG. 2, a vehicle front end portion 18b of the crossmember 18 has a center portion 32, crossmember bend portions 34, and crossmember fixation portions 36. The center portion 32 is situated at the center of the crossmember 18 in the vehicle width direction and extends straight in the vehicle width direction. The crossmember bend portions 34 are situated outward of the center portion 32 and bend toward the front of the vehicle in a plan view as the crossmember bend portions 34 extend from the center portion 32 toward the respective front side frames 14.

Figure 4:
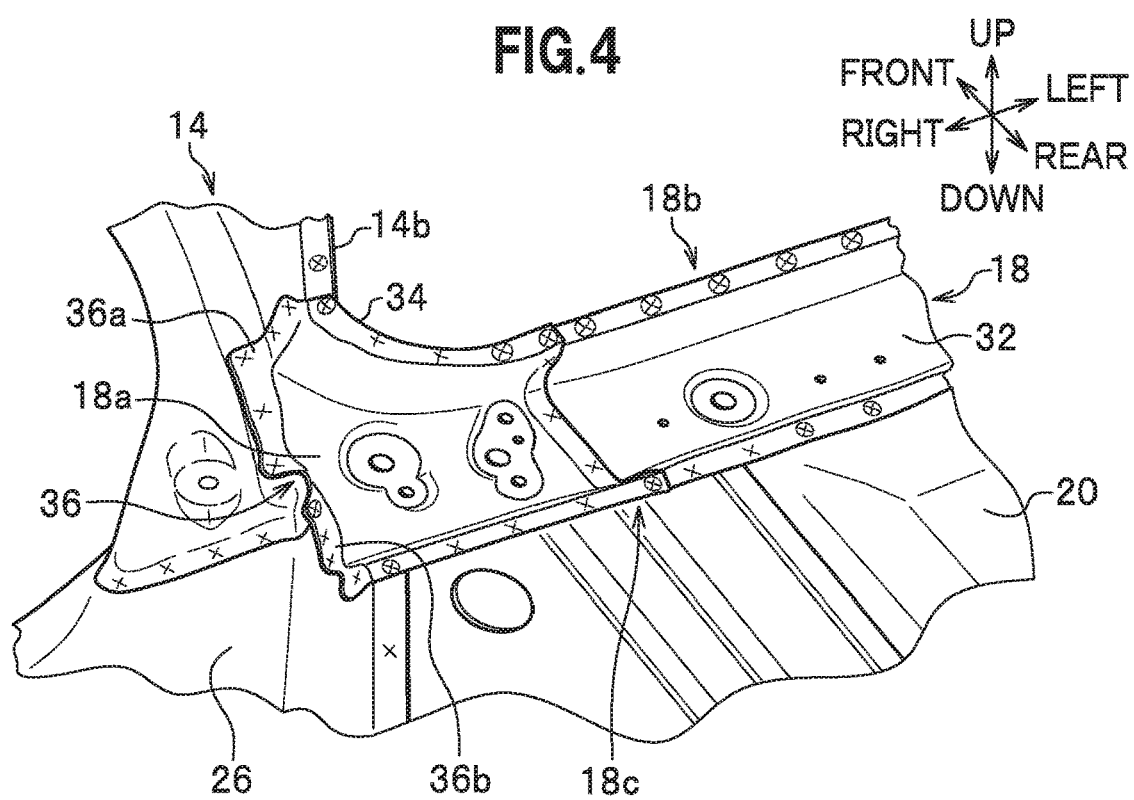
FIG. 4 is a perspective view illustrating a crossmember fixation portion.
Figure 5:
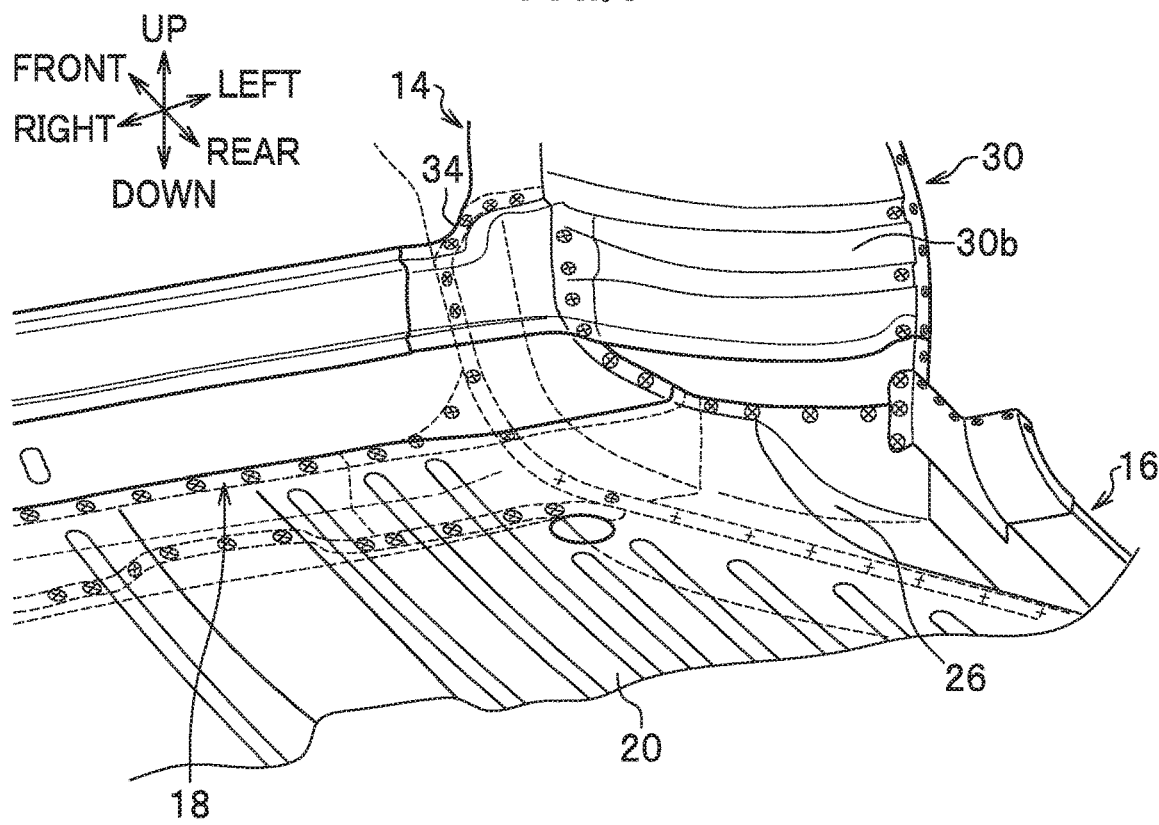
FIG. 5 is a perspective view illustrating an end portion of the crossmember in the vehicle width direction and its surrounding area.

The crossmember fixation portions 36 are provided in the respective end portions 18a, 18a of the crossmember 18 in the vehicle width direction. As illustrated in FIG. 4, each of the crossmember fixation portions 36 is joined (fixed), at its paired joint flange portions 36a, 36b, to both an inner portion of a vehicle rear end portion of the corresponding front side frame 14 and an inner portion of a vehicle front end portion of the corresponding outrigger 26.

Note that a vehicle rear end portion 18c of the crossmember 18 is formed by a planar surface being flat over all of the center portion 32 and the crossmember fixation portions 36.

The paired left and right outriggers 26, 26 and the paired left and right side sills 16, 16 are situated on both sides of the vehicle body 12 in the vehicle width direction, respectively. Each of the outriggers 26 has substantially the shape of a right triangle in a bottom view and is connected to a vehicle rear end portion of the corresponding front side frame 14. Further, a hypotenuse 38 of each outrigger 26 extends straight. Each side sill 16 is connected to a side portion 40 of the corresponding outrigger 26 at the outer side of the outrigger 26 in the vehicle width direction, the side portion 40 facing the hypotenuse 38 and extending in the vehicle front-rear direction.

Each set of the front side frame 14 and the outrigger 26 includes a fixation portion 42 at which a vehicle rear end portion of the front side frame 14 and a vehicle front end portion of the outrigger 26 are connected. The end portions 18a, 18a of the crossmember 18 in the vehicle width direction are fixed to the respective fixation portions 42.

The paired left and right side sills 16, 16 are situated on the respective sides of the vehicle body 12 in the vehicle width direction and extend in the vehicle front-rear direction. Each side sill 16 extends from the front end of the floor panel 20 (front floor end) to the rear end of the floor panel 20 (rear floor end).

Each side sill 16 integrally includes a side sill inner member, a side sill outer member, and a side sill stiffener which are connected together. The side sill inner member is shaped like a hat in cross section, and is situated at the inner side in the vehicle width direction. The side sill outer member is shaped like a hat in cross section, and is situated at the outer side in the vehicle width direction. The side sill stiffener is situated between the side sill inner member and the side sill outer member. The lower end of the side sill stiffener is integrally connected to the side sill inner member and the side sill outer member, while being sandwiched by the lower end of the side sill inner member and the lower end of the side sill outer member.

The floor panel 20 is a plate-shaped member provided across the paired left and right side sills 16, 16. The floor panel 20 is formed by a substantially flat surface extending toward the rear of the vehicle, and is, for example, not provided with the center tunnel, the center tunnel crossmember, and the like disclosed in Patent Literature 1, which is a related art.

Figure 3:
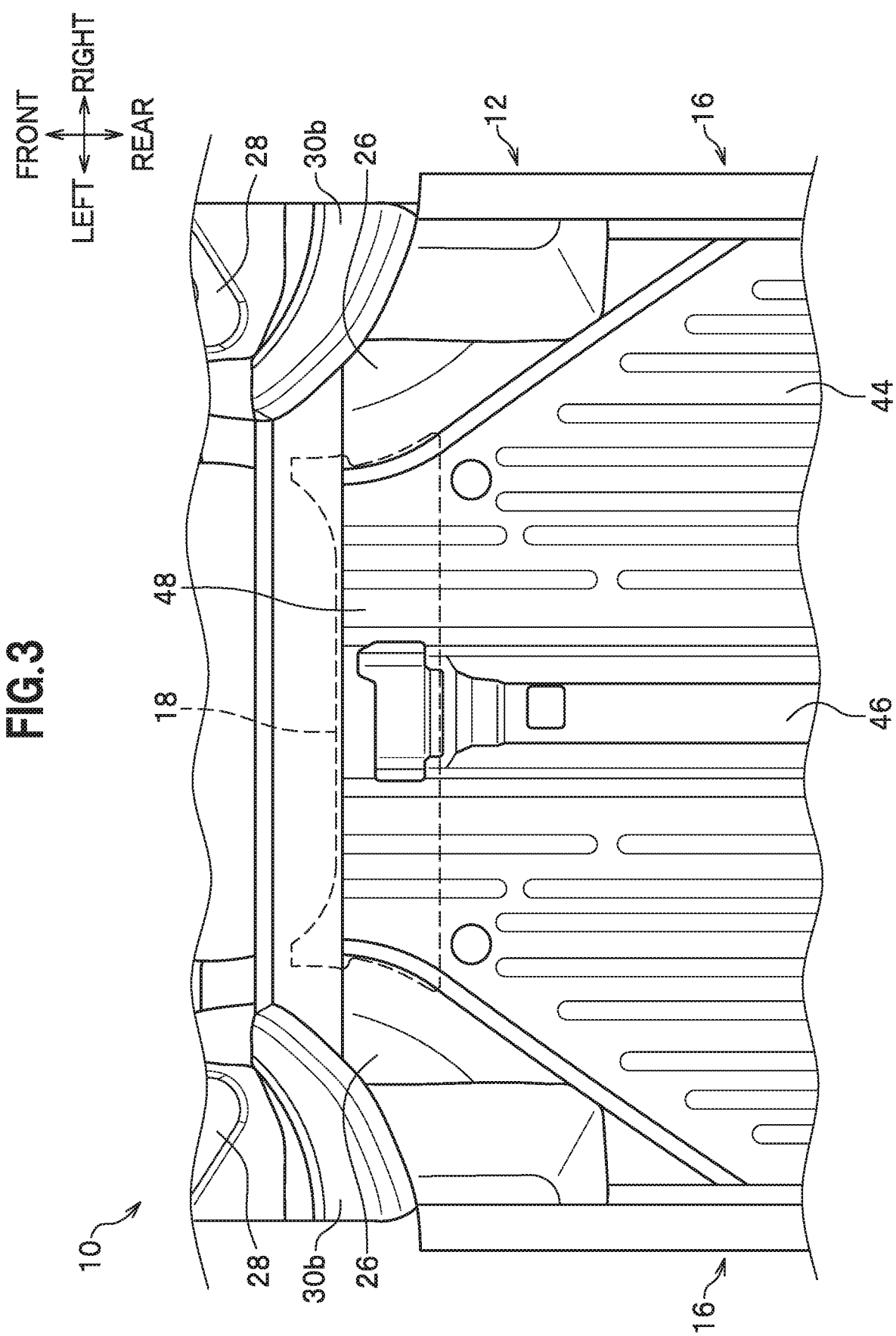
FIG. 3 is a plan view of the crossmember and its surrounding area illustrated in FIG. 2, seen from above.

The floor panel 20 has a substantially-flat general portion 44, a raised portion 46, and a step portion 48 (see FIG. 3). The raised portion 46 is raised upward and extends from the crossmember 18 to the rear of the vehicle. The step portion 48 is situated closer to the front of the vehicle than the raised portion 46, and is vertically lower in height than the raised portion 46. Further, in a bottom view, the crossmember 18 is situated on the lower surface of the step portion 48 and extends in the vehicle width direction (see FIG. 3).

Figure 6:
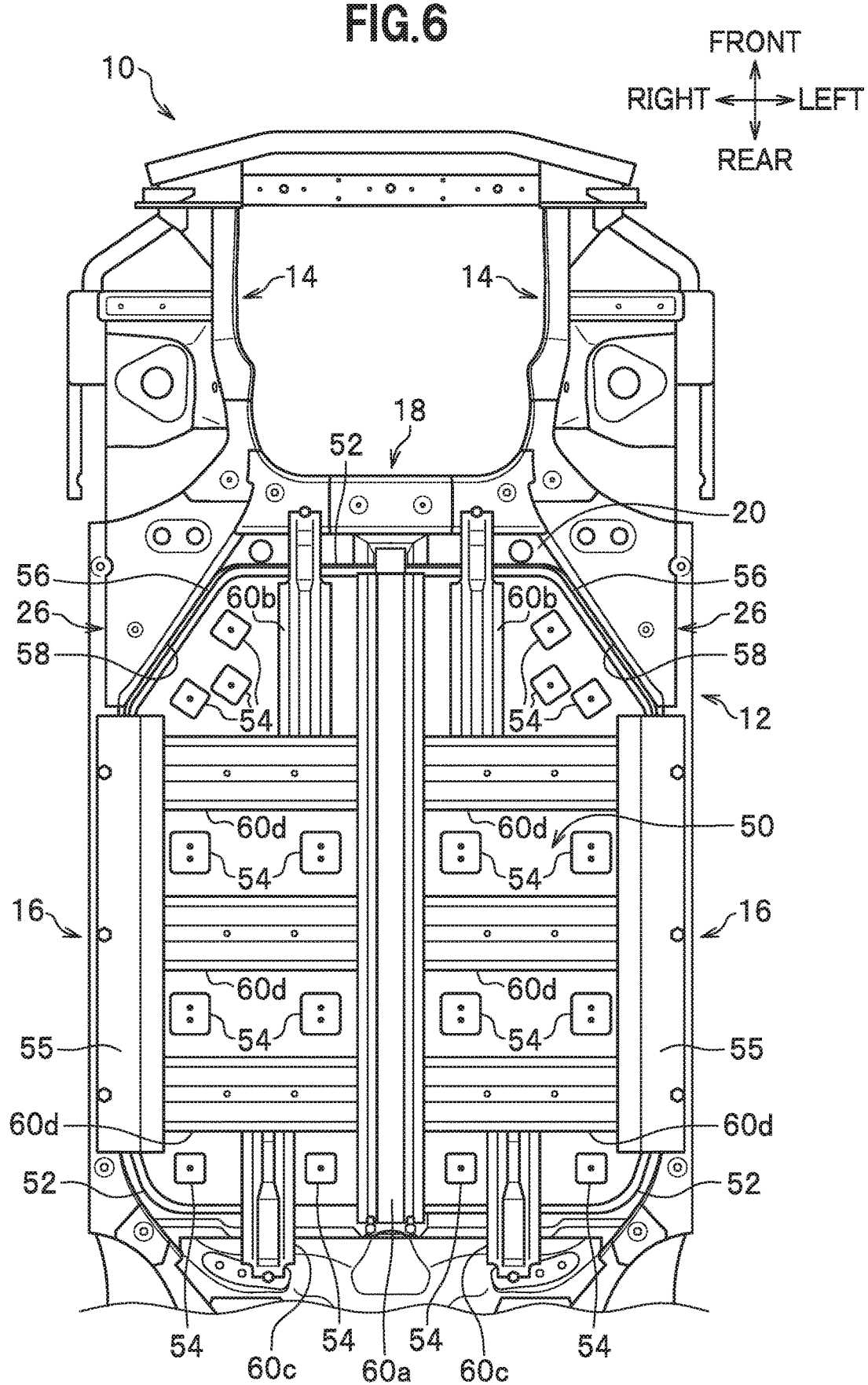
FIG. 6 is a bottom view illustrating a battery disposed on the lower surface of a floor panel.

As illustrated in FIG. 6, a battery 50 is disposed on the lower surface of the floor panel 20 in a bottom view. The outriggers 26 are disposed on the respective sides of the battery 50 in the vehicle width direction, near a vehicle front end portion of the battery 50.

As illustrated in FIG. 6, the battery 50 includes a battery case 52 which is substantially rectangular in a bottom view and a plurality of battery packs 54 housed in the battery case 52. The battery case 52 is fixed to the side sills 16 at its fixation plates 55 bolted to the side sills 16.

The battery case 52 has slanted surfaces 56 at its vehicle front end portions situated outward in the vehicle width direction. Each slanted surface 56 is slanted toward the corresponding side sill 16 in a bottom view. Moreover, each outrigger 26 has a slanted surface 58 on its inner wall in the vehicle width direction. The slanted surface 58 is slanted toward the corresponding side sill 16 in a bottom view.

The slanted surface 56 of the battery case 52 and the slanted surface 58 of the outrigger 26 on the same side face each other and are substantially in parallel with each other. In other words, when the slanted surface 56 of the battery case 52 and the slanted surface 58 of the outrigger 26 are disposed to face each other substantially in parallel with clearance therebetween, the outrigger 26 and the battery case 52 can be disposed in place using the slanted surfaces 56, 58.

Inside the battery case 52, a plurality of bone members are disposed to partition the plurality of battery packs 54. The plurality of bone members are constituted by a center bone member 60a, front bone members 60b, rear bone members 60c, and cross bone members 60d. The center bone member 60a, which is for piping, is disposed at the center of the battery case 52 in the vehicle width direction and extends in the vehicle front-rear direction. The front bone members 60*b* are disposed at a vehicle front portion of the battery case 52 and extend in the front-rear direction substantially in parallel with each other. The cross bone members 60*d* are disposed at a plurality of locations, extending in the vehicle width direction substantially in parallel with each other.

The vehicle 10 to which the vehicle body front structure according to the present embodiment is applied is basically configured as described above. Next, advantageous effects that the vehicle body front structure according to the present embodiment offer are described.

Figure 7:
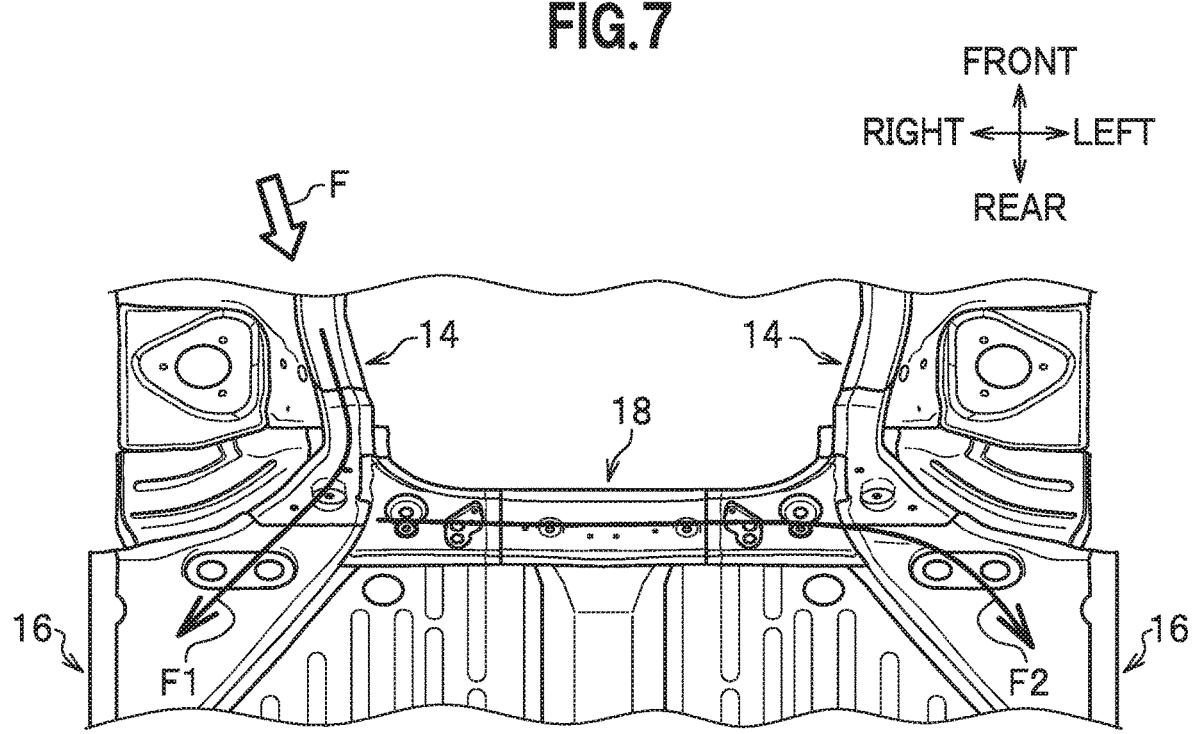
FIG. 7 is a bottom view illustrating how an offset load inputted from the front of a vehicle is transmitted through the crossmember.

In the present embodiment, the end portions 18*a*, 18*a* of the crossmember 18 are connected to the side frame bend portions 14*b*, 14*b* of the paired left and right front side frames 14, 14, respectively. Thus, in the present embodiment, when an impact load (e.g., an offset impact load F) is inputted to one of the front side frames 14 for example as illustrated in FIG. 7, an impact load F1 is transmitted to one of the side sills 16 on the impact side, and also, an impact load F2 can be transmitted to the other side sill 16 on the non-impact side through the crossmember 18.

In other words, for example, when the crossmember 18 is connected to the side frame bend portions 14*b* of the front side frames 14 instead of areas closer to the vehicle rear than the side frame bend portions 14*b* of the front side frames 14, more impact load is allowed to be transmitted through the crossmember 18. As a result, the efficiency of impact load transmission to the side sill 16 on the non-impact side can be improved.

Further, in the present embodiment, when an impact load inputted from the front of the vehicle is transmitted to both of the left and right side sills 16, 16, the crossmember 18 can prevent the paired left and right front side frames 14, 14 from collapsing inward in the vehicle width direction.

In the present embodiment, the vehicle front end portion 18*b* of the crossmember 18 has the crossmember bend portions 34 that bend from the center portion 32 toward the front of the vehicle. Thereby, in the present embodiment, an impact load inputted from one of the front side frame 14 can be efficiently transmitted to the side sill 16 on the non-impact side through the crossmember bend portion 34.

In the present embodiment, the end portions 18*a*, 18*a* of the crossmember 18 in the vehicle width direction are fixed to the fixation portions 42 between the front side frames 14 and the outriggers 26, respectively. In other words, the end portions 18*a*, 18*a* of the crossmember 18 in the vehicle width direction are connected to both the front side frames 14 and the outriggers 26. Thus, the present embodiment can improve the strength and rigidity of the fixation portions 42 that fix the front side frames 14 and the outriggers 26 together, and allows an impact load inputted from the front of the vehicle to be efficiently transmitted to the side sill 16 on the non-impact side through the crossmember 18.

In the present embodiment, the floor panel 20 has the step portion 48 which is situated closer to the front of the vehicle than the raised portion 46 and which is vertically lower in height than the raised portion 46. Further, in the present embodiment, the crossmember 18 is disposed on the lower surface of the step portion 48 in a bottom view, extending in the vehicle width direction. According to the present embodiment in which the floor panel 20 has, at its vehicle front part, the step portion 48 lower in height than the raised portion 46, an impact load inputted from the front of the vehicle can be transmitted to the side sills 16 by the floor panel 20 itself.

In addition, according to the present embodiment in which the crossmember 18 is disposed on the step portion 48 of the floor panel 20, vertical displacement of the crossmember 18 can be reduced, which can improve the efficiency of load transmission to the front side frame 14 on the non-impact side.

In the present embodiment, the outriggers 26 are disposed outward of the vehicle front end portion of the battery 50 in the vehicle width direction. According to the present embodiment in which the outriggers 26 are thus disposed outward of the vehicle front end portion of the battery 50 in the vehicle width direction, the capacity of the battery 50 can be increased.

Further, according to the present embodiment in which the battery 50 is disposed on the lower surface of the floor panel 20, even when the vehicle body frame cannot be disposed in the rear of the vehicle, the efficiency of load transmission to the side sills 16 can be improved by the outriggers 26 extending to reach the outer edge portions of the battery 50 in the width direction.

In the present embodiment, each side frame bend portion 14*b* has the outer bend point P1 which is situated on an outer side thereof in the vehicle width direction and which is, in the vehicle width direction, opposite the corresponding vehicle front end portion 24 of the crossmember 18, the vehicle front end portion 24 being on an outer side of the crossmember 18 in the vehicle width direction. Thus, in the present embodiment, an impact load inputted from one of the front side frames 14 can be transmitted even more smoothly to the crossmember 18 through the vehicle front end portion 24 of the crossmember 18, which is opposite the outer bend point P1 and on an outer side of the crossmember 18 in the vehicle width direction.

In the present embodiment, each side frame bend portion 14*b* has the inner bend point P2 which is situated on an inner side thereof in the vehicle width direction and which is situated on the vehicle width direction of the crossmember 18. Thus, in the present embodiment, an impact load inputted from one of the front side frames 14 can be transmitted even more smoothly via the crossmember 18 adjacent to the inner bend point P2 in the vehicle width direction.

In the present embodiment, the crossmember 18 extends substantially straight in the vehicle width direction. Thus, in the present embodiment, an impact load inputted through one of the front side frames 14 can be transmitted even more efficiently to the side sill 16 on the non-impact side through the crossmember 18 extending substantially straight.

In the present embodiment, each outrigger 26 has substantially the shape of a right angle in a bottom view, and the hypotenuse 38 of the right triangle extends straight. Thus, in the present embodiment, an impact load inputted through one of the front side frames 14 can be transmitted even more efficiently to the side sill 16 on the non-impact side through the crossmember 18 and the hypotenuse 38 of the outrigger 26.

In the present embodiment, the battery case 52 has the slanted surfaces 56 at its vehicle front end portions situated outward in the vehicle width direction, the slanted surfaces 56 being slanted toward the respective side sills 16 in a bottom view. Further, the outriggers 26 each have the slanted surface 58 on its inner wall in the vehicle width direction, the slanted surface 58 being slanted toward the corresponding side sill 16 in a bottom view.

In the present embodiment, the slanted surface 56 of the battery case 52 and the slanted surface 58 of the outrigger 26 on the same side are disposed to face each other substantially in parallel. This allows a plurality of battery packs 54 to be disposed along the slanted surfaces 56 of the battery case 52. This enables an increase in the overall capacity of the battery 50 in the present embodiment. This also enables elongation of the slanted surface 58 (the hypotenuse) of each outrigger 26 having substantially the shape of a right angle, improving the rigidity and strength against impact loads.

What is claimed is:

1. A vehicle body front structure comprising:
   paired left and right front side frames extending in a vehicle front-rear direction;
   a crossmember that extends in a vehicle width direction and is suspended between the paired left and right front side frames; and
   a floor panel having a raised portion that is raised upward, wherein
   the front side frames respectively have side frame bend portions at rear portions thereof, the side frame bend portions bending inward in the vehicle width direction,
   at least one of end portions of the crossmember in the vehicle width direction is connected to a corresponding one of the side frame bend portions,
   the floor panel has a step portion which is situated closer to a vehicle front than the raised portion and is at lower height than the raised portion, and
   in a bottom view, the crossmember is disposed on a lower surface of the step portion and extends in the vehicle width direction.

2. The vehicle body front structure according to claim 1, wherein
   a vehicle front end portion of the crossmember has
   a center portion extending straight in the vehicle width direction, and
   crossmember bend portions that bend from the center portion to a vehicle front in a plan view.

3. The vehicle body front structure according to 1, further comprising:
   paired left and right outriggers connected to vehicle rear end portions of the respective front side frames; and
   paired left and right side sills connected to outer portions of the respective outriggers in the vehicle width direction, wherein
   the crossmember is fixed to portions at which the front side frames and the outriggers are fixed to each other.

4. A vehicle body front structure comprising:
   paired left and right front side frames extending in a vehicle front-rear direction;
   a crossmember that extends in a vehicle width direction and is suspended between the paired left and right front side frames;
   paired left and right outriggers connected to vehicle rear end portions of the respective front side frames;
   paired left and right side sills connected to outer portions of the respective outriggers in the vehicle width direction;
   a floor panel having a raised portion that is raised upward; and
   a battery disposed on a lower surface of the floor panel in a bottom view,
   wherein
   the front side frames respectively have side frame bend portions at rear portions thereof, the side frame bend portions bending inward in the vehicle width direction,
   at least one of end portions of the crossmember in the vehicle width direction is connected to a corresponding one of the side frame bend portions,
   the crossmember is fixed to portions at which the front side frames and the outriggers are fixed to each other,
   the floor panel has a step portion which is situated closer to a vehicle front than the raised portion and is at lower height than the raised portion,
   in a bottom view, the crossmember is disposed on a lower surface of the step portion and extends in the vehicle width direction, and
   the outriggers are disposed outward of a vehicle front end portion of the battery in the vehicle width direction.

5. The vehicle body front structure according to claim 1, wherein
   the side frame bend portions each have an outer bend point situated on an outer side thereof in the vehicle width direction, and
   the outer bend point is opposite a vehicle front end portion of the crossmember situated on an outer side of the crossmember in the vehicle width direction.

6. The vehicle body front structure according to claim 1, wherein
   the side frame bend portions each have an inner bend point situated on an inner side thereof in the vehicle width direction, and
   the inner bend point is situated adjacent to the crossmember in the vehicle width direction.

7. The vehicle body front structure according to claim 1, wherein
   the crossmember extends substantially straight in the vehicle width direction.

8. The vehicle body front structure according to claim 3, wherein
   the outriggers are each substantially shaped like a right triangle in a bottom view, and
   a hypotenuse of the right triangle extends straight.

9. The vehicle body front structure according to claim 4, wherein
   the battery includes a battery case,
   each of vehicle front end portions of the battery case situated on outer sides in the vehicle width direction has a slanted surface being slanted toward a corresponding one of the side sills in a bottom view,
   an inner wall of each of the outriggers in the vehicle width direction has a slanted surface being slanted toward a corresponding one of the side sills in a bottom view, and
   the slanted surface of the battery case and the slanted surface of the outrigger on the same side face each other substantially in parallel with each other.

* * * * *